(12) United States Patent
Thompson et al.

(10) Patent No.: US 8,753,042 B1
(45) Date of Patent: Jun. 17, 2014

(54) DRILL TIE STAKE

(71) Applicant: Drill Tie Systems, Inc., Hialeah, FL (US)

(72) Inventors: Karen Thompson, Pembroke Pines, FL (US); Jeffery Homberger, Satellite Beach, FL (US); Thomas Homberger, Palm Beach Gardens, FL (US)

(73) Assignee: Drill Tie Systems, Inc., Hialeah, FL (US)

( * ) Notice: Subject to any disclaimer, the term of this patent is extended or adjusted under 35 U.S.C. 154(b) by 0 days.

(21) Appl. No.: 13/693,384

(22) Filed: Dec. 4, 2012

(51) Int. Cl.
*E21D 21/00* (2006.01)
*F16B 15/00* (2006.01)

(52) U.S. Cl.
USPC .......... 405/259.1; 405/302.7; 405/302.6; 411/480; 411/533

(58) Field of Classification Search
USPC .......... 405/302.7, 302.6, 302.4, 259.1, 252.1, 405/253; 411/480, 396, 533
See application file for complete search history.

(56) References Cited

U.S. PATENT DOCUMENTS

| | | | |
|---|---|---|---|
| 360,225 A * | 3/1887 | Kanters | 405/19 |
| 746,006 A | 12/1903 | Brigham | |
| 970,423 A | 9/1910 | Cunningham | |
| 1,144,700 A | 6/1915 | Edwards | |
| 1,497,859 A | 6/1924 | Lilly | |
| 1,767,565 A | 6/1930 | Thrift | |
| 2,840,092 A | 6/1958 | Hill | |
| 2,913,204 A | 11/1959 | Stewart | |
| 3,237,904 A | 3/1966 | Abruzese | |
| 3,570,254 A * | 3/1971 | Turzillo | 405/18 |
| 3,785,610 A * | 1/1974 | Dagiel | 249/214 |
| 3,870,428 A | 3/1975 | Jackson | |
| 3,877,340 A | 4/1975 | Knohl | |
| 3,921,495 A | 11/1975 | Braun | |
| D240,362 S | 6/1976 | Russo | |
| D245,757 S | 9/1977 | Fisher | |
| 4,312,464 A * | 1/1982 | Treiman | 223/85 |
| D285,409 S | 9/1986 | Lemkin | |
| 4,610,568 A * | 9/1986 | Koerner | 405/19 |
| D300,508 S | 4/1989 | Viening | |
| 5,058,315 A * | 10/1991 | Wagner | 411/456 |
| 5,063,724 A * | 11/1991 | vanden Boogaart | 405/259.5 |
| 5,109,896 A | 5/1992 | Tomes | |
| D335,076 S | 4/1993 | Shinjo | |
| 5,256,007 A * | 10/1993 | Allen | 405/302.4 |
| 5,449,139 A | 9/1995 | Herelier | |

(Continued)

FOREIGN PATENT DOCUMENTS

JP 59228510 A * 12/1984 ............ E02B 3/12

OTHER PUBLICATIONS

Milliken, Milliken Concrete Cloth, brochure, 2 pages.

(Continued)

*Primary Examiner* — Frederick L Lagman
(74) *Attorney, Agent, or Firm* — Brian S. Steinberger; Law Offices of Brian S. Steinberger, P.A.

(57) ABSTRACT

Tie fastening devices, systems apparatus, and methods of fastening and staking concrete cloth, and landscape and erosion control stabilizer sheets and timbers in place with a drill adapted fastener. The fasteners can elongated with anvil top ends that can be mounted to a drill chuck and lower cutting heads with arrow shaped blades that can raised burr edges for driving into ground surfaces.

16 Claims, 17 Drawing Sheets

(56) References Cited

U.S. PATENT DOCUMENTS

| | | | |
|---|---|---|---|
| 5,564,232 | A | 10/1996 | Callaway |
| 5,630,292 | A | 5/1997 | Heinz |
| D380,947 | S | 7/1997 | Adams |
| 5,651,641 | A * | 7/1997 | Stephens et al. ........... 405/302.6 |
| D383,054 | S | 9/1997 | Adams |
| 5,755,545 | A | 5/1998 | Banks |
| 5,788,444 | A | 8/1998 | Losada |
| D407,281 | S | 3/1999 | Antel |
| 5,951,202 | A * | 9/1999 | Brown ....................... 405/302.6 |
| 5,951,208 | A * | 9/1999 | Wilson et al. .............. 405/259.6 |
| 6,233,889 | B1 | 5/2001 | Hulsey |
| D447,025 | S | 8/2001 | Hughes |
| D452,425 | S | 12/2001 | Sato |
| D466,379 | S | 12/2002 | Barbi |
| D466,765 | S | 12/2002 | Barbi |
| D495,567 | S | 9/2004 | Gontar |
| D495,932 | S | 9/2004 | Kopka |
| 7,044,688 | B2 * | 5/2006 | Dever et al. ................ 405/302.1 |
| 7,331,140 | B1 | 2/2008 | Mason |
| 7,384,217 | B1 * | 6/2008 | Barrett et al. .............. 405/302.7 |
| D618,088 | S | 6/2010 | Gaylor |
| D644,094 | S | 8/2011 | Togami |
| D683,208 | S | 5/2013 | Nocelo Stelin |
| 2004/0086342 | A1 * | 5/2004 | Milne ........................ 405/259.1 |
| 2010/0021245 | A1 * | 1/2010 | Li .............................. 405/259.5 |
| 2010/0154347 | A1 | 6/2010 | Jessen |
| 2011/0013992 | A1 * | 1/2011 | Fujii et al. .................. 405/302.7 |

OTHER PUBLICATIONS

Milliken, Milliken Concrete Cloth, Ground Breaking Material Technology, online, retrieved on Jul. 2, 2012, retrieved from http://concretecloth.milliken.com/Pages/home.aspx, 2 pages.

Milliken, Concrete Cloth User Guide, 11 pages.

* cited by examiner

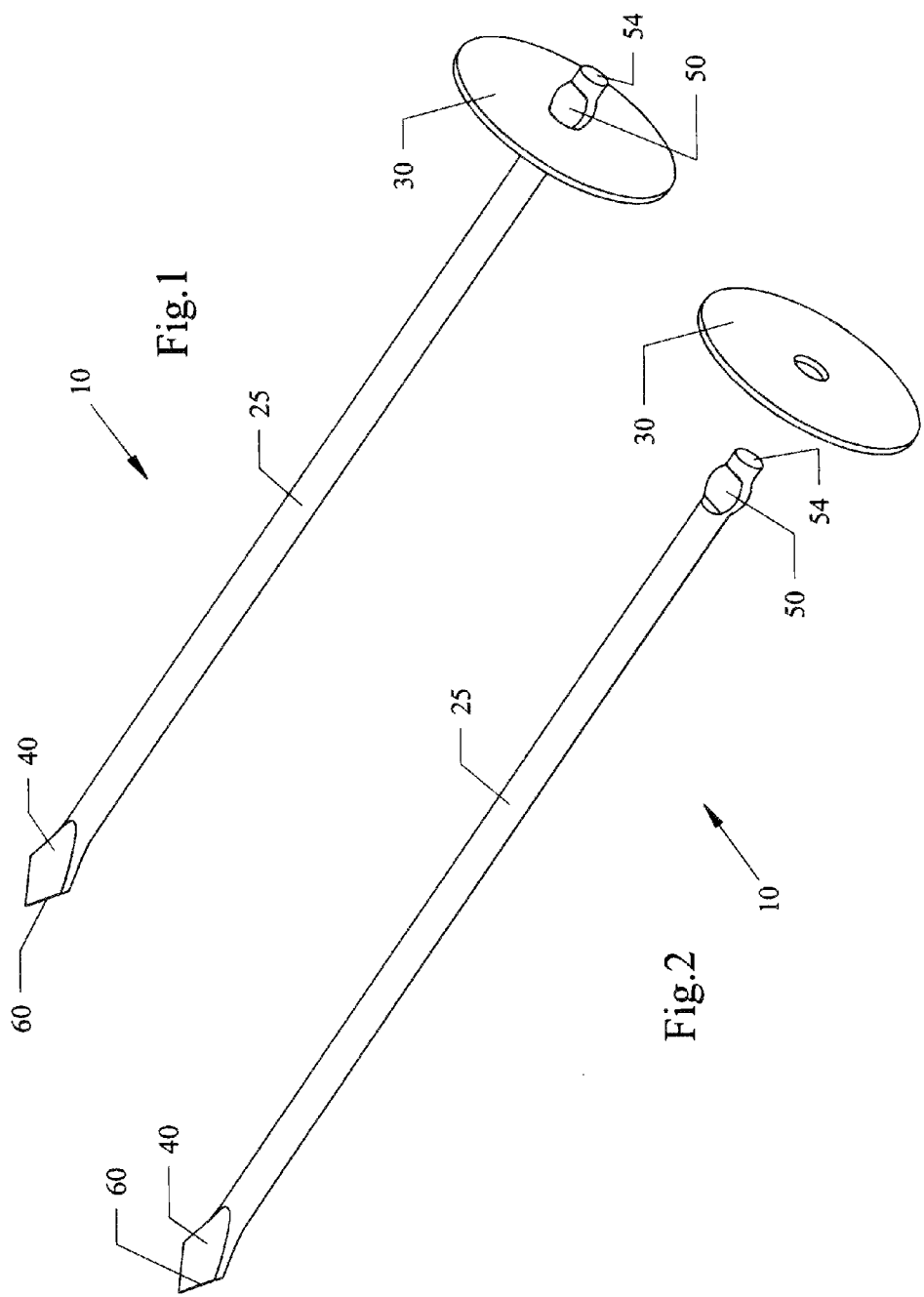

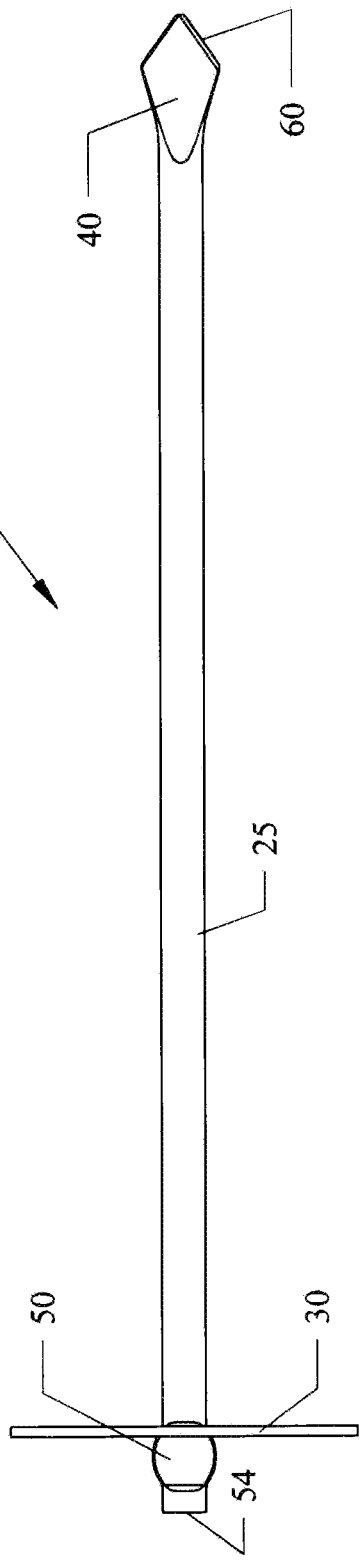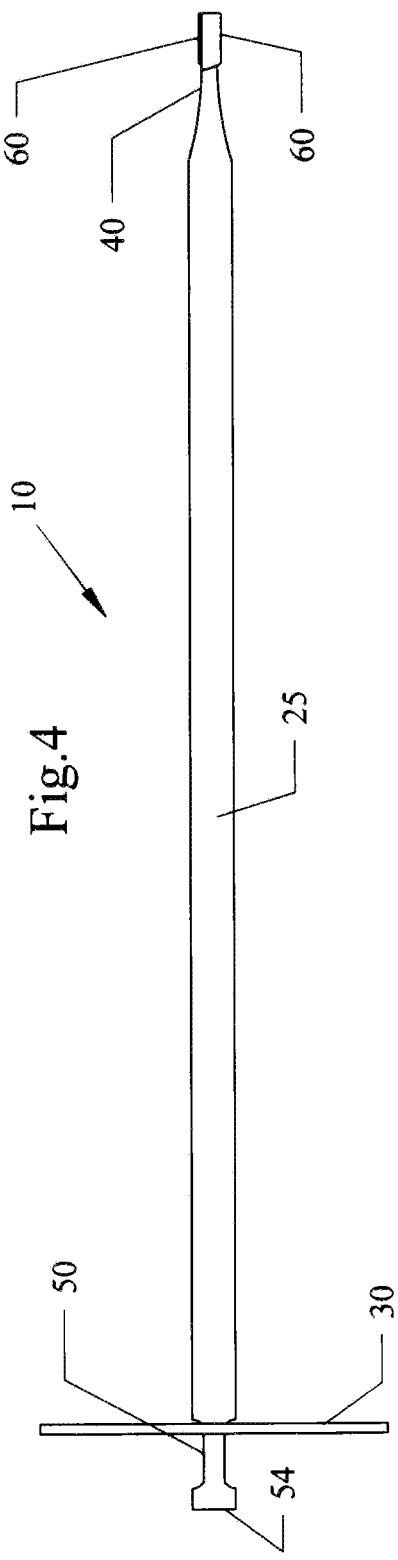

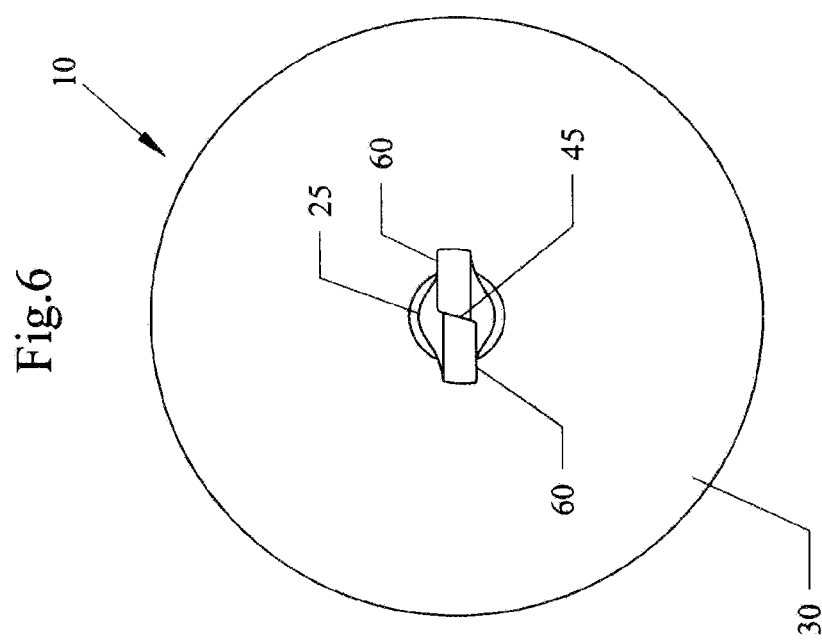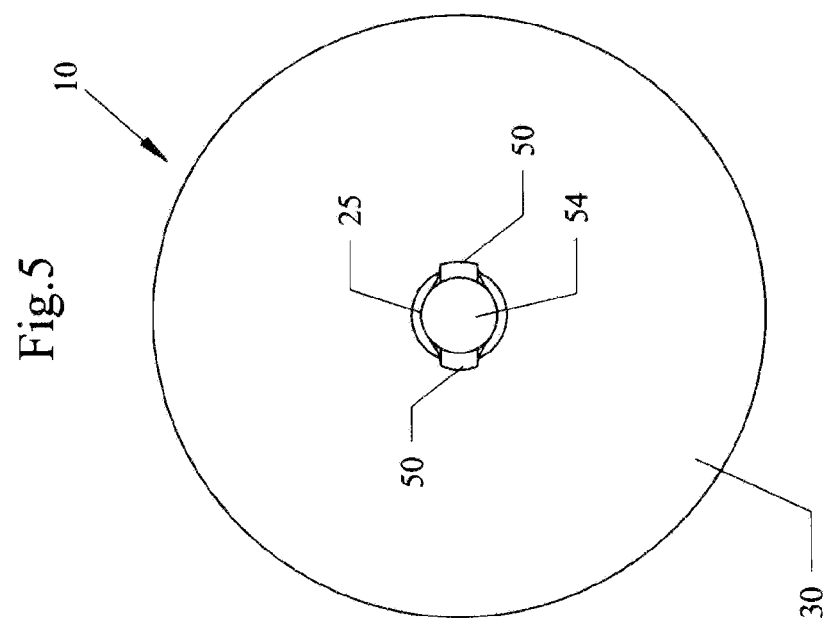

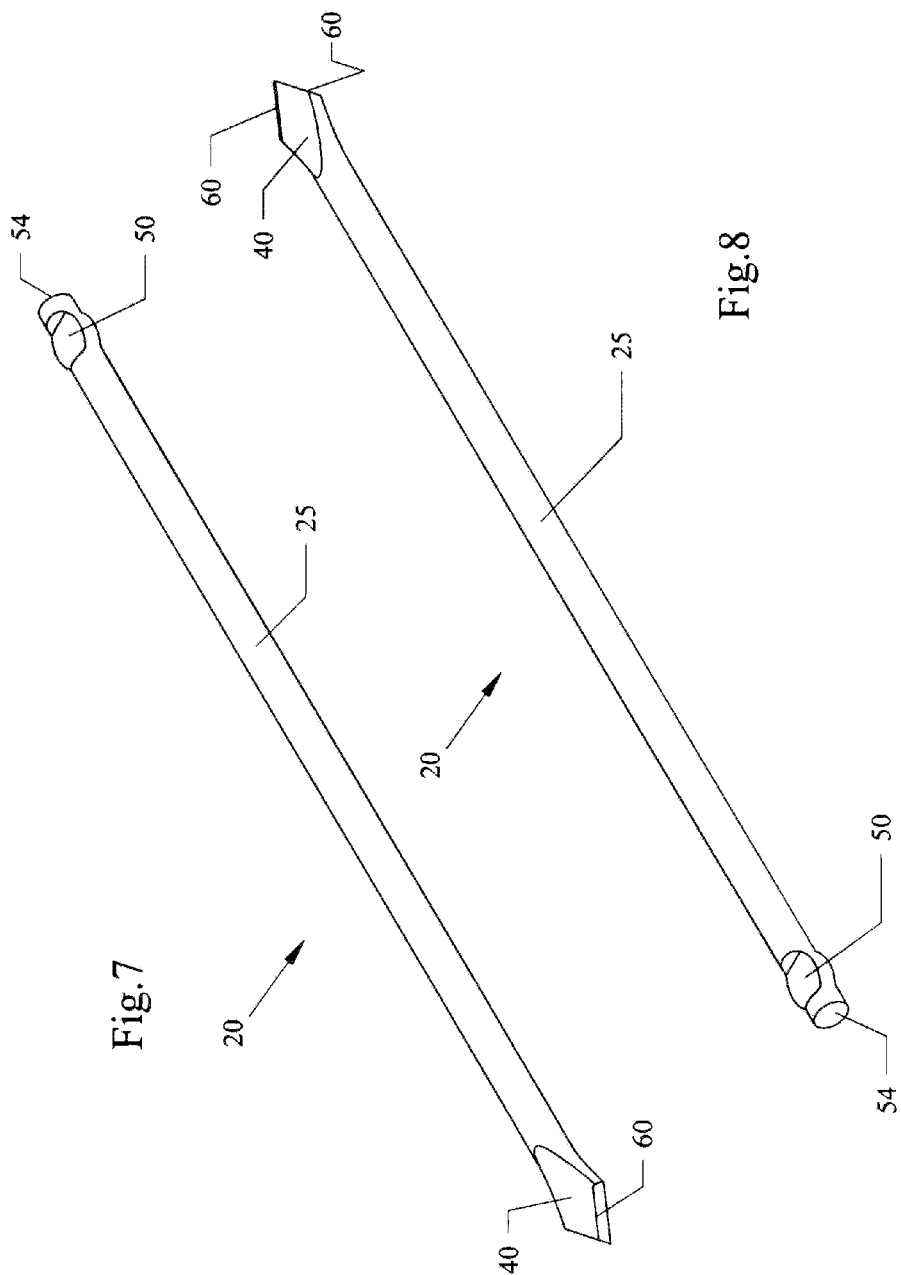

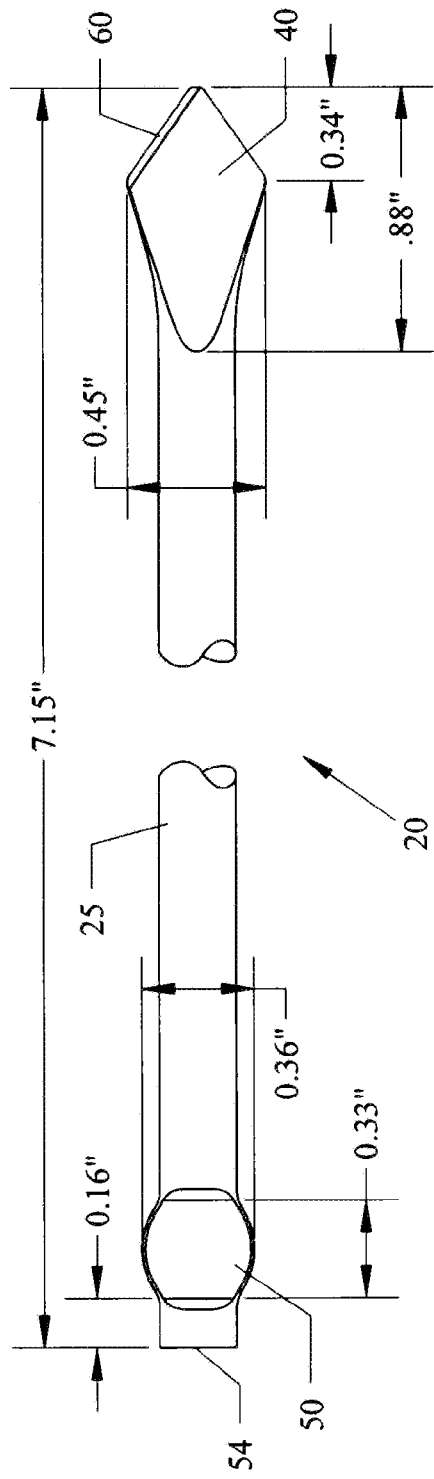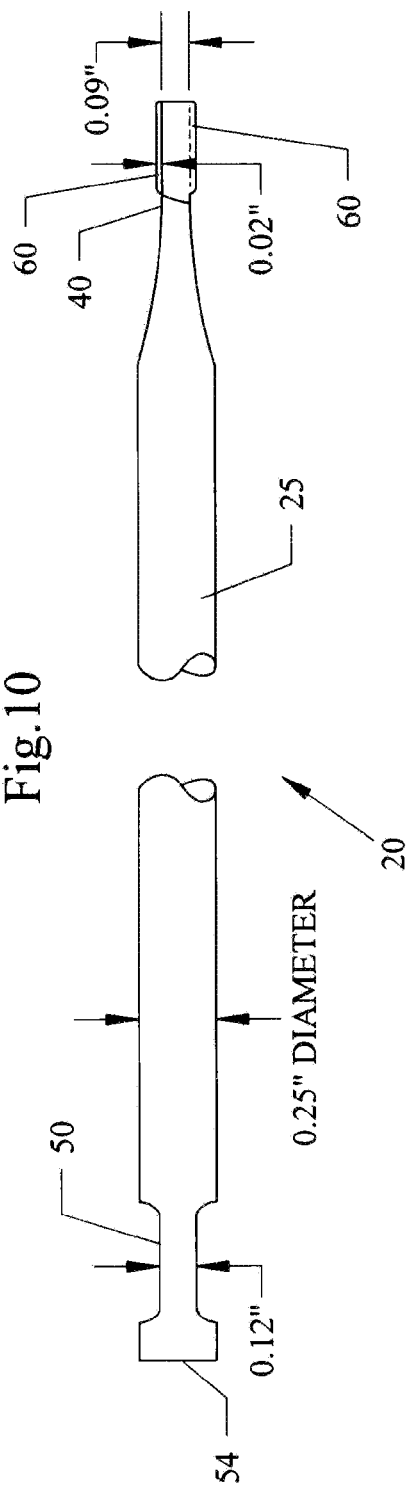

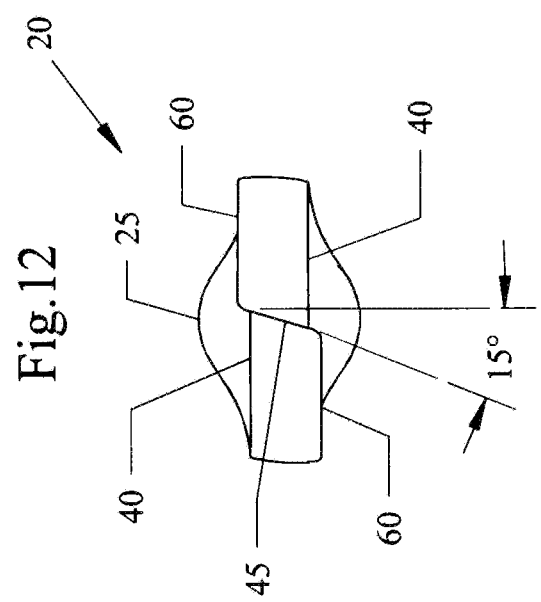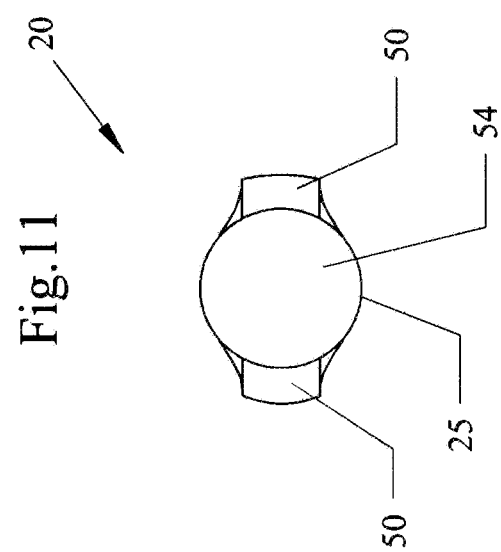

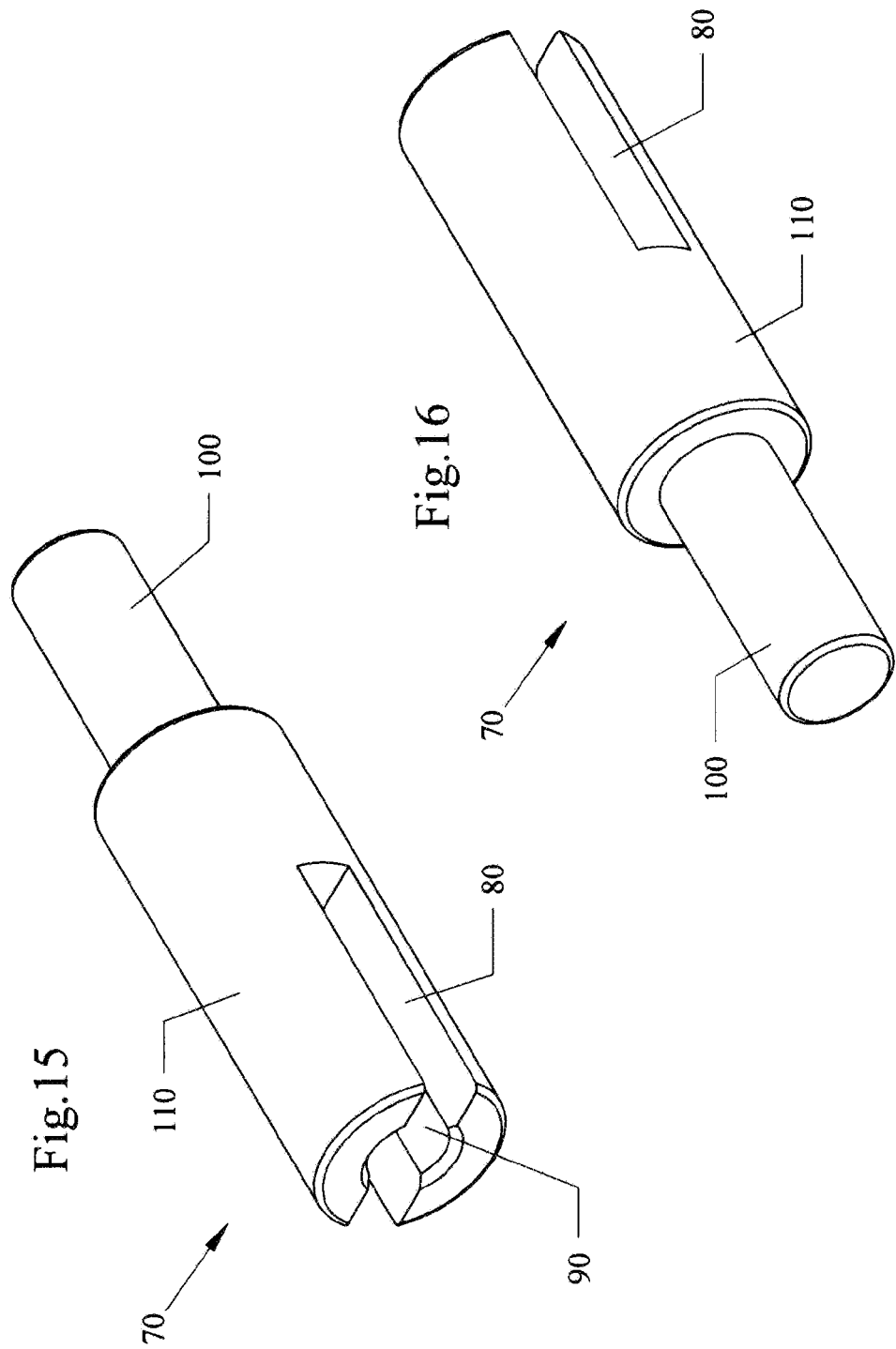

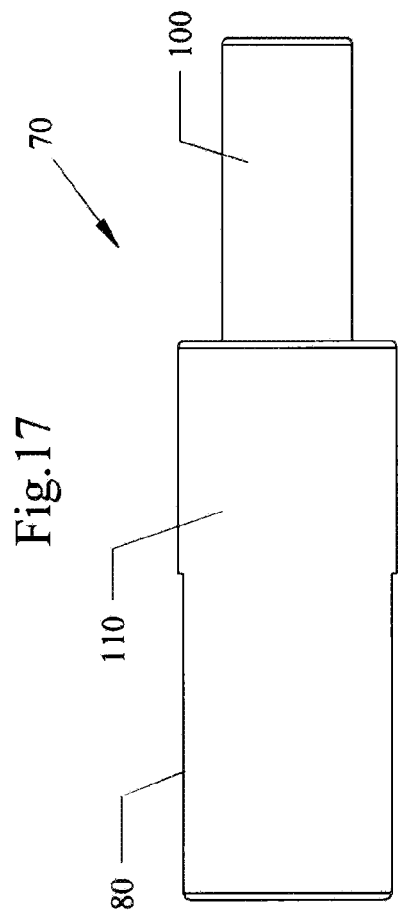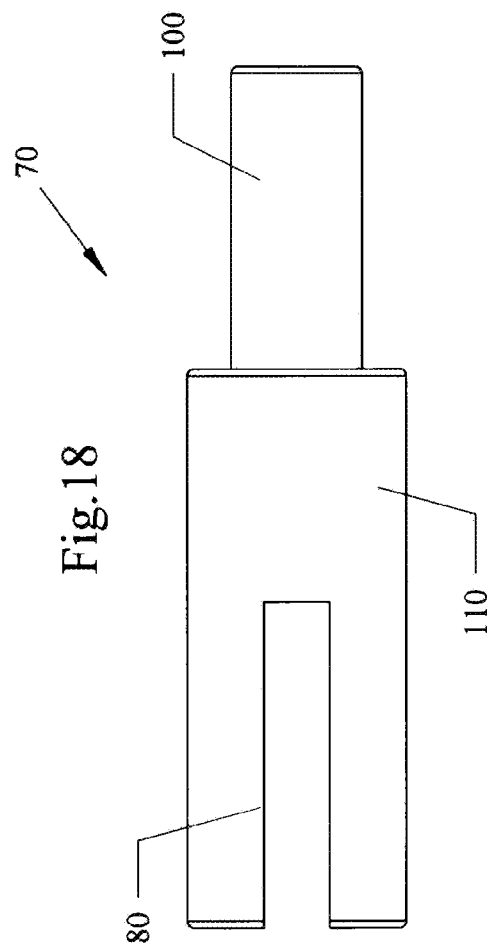

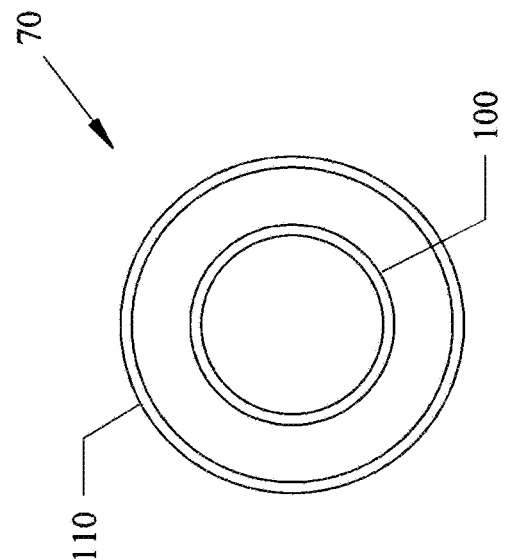
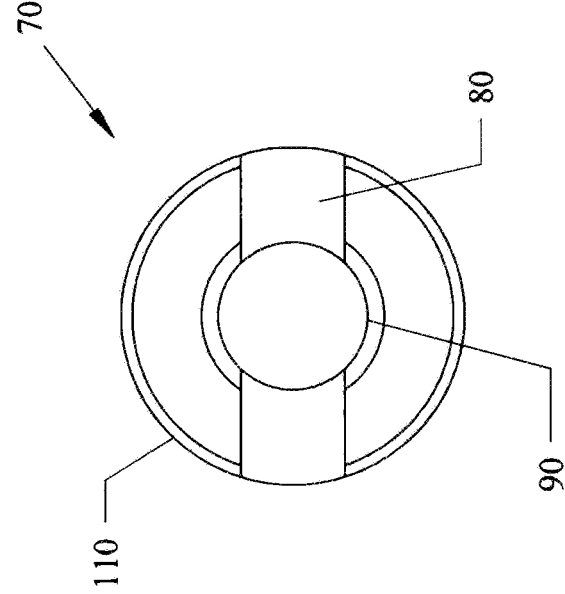

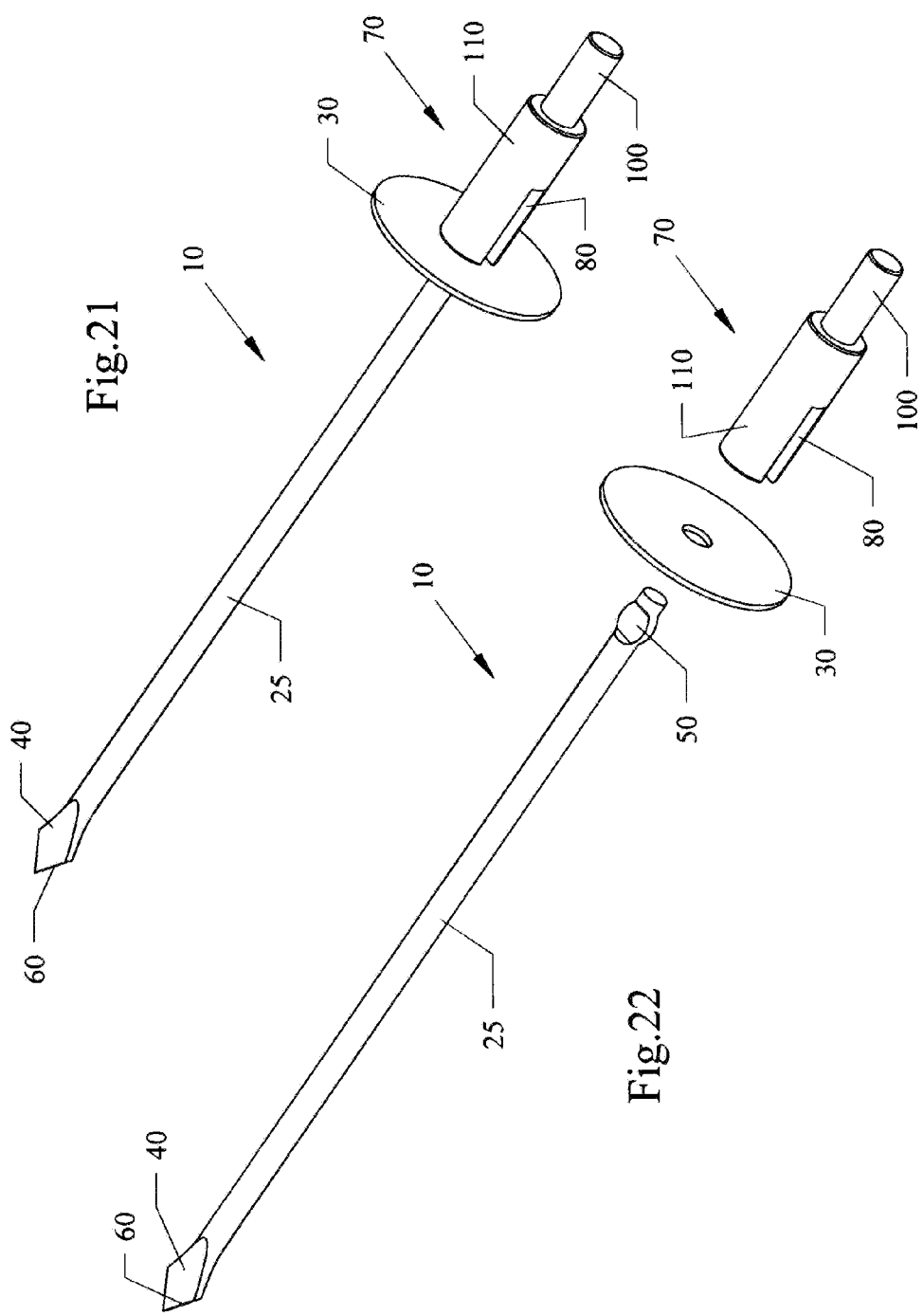

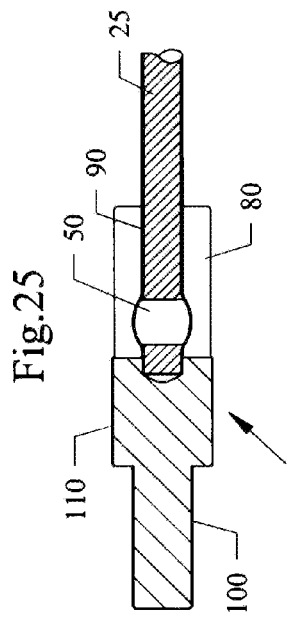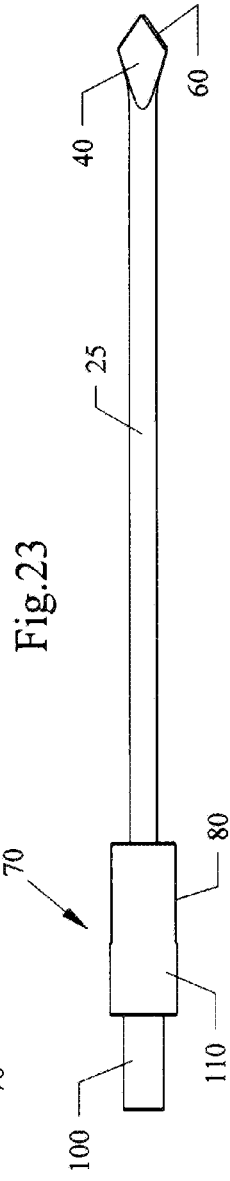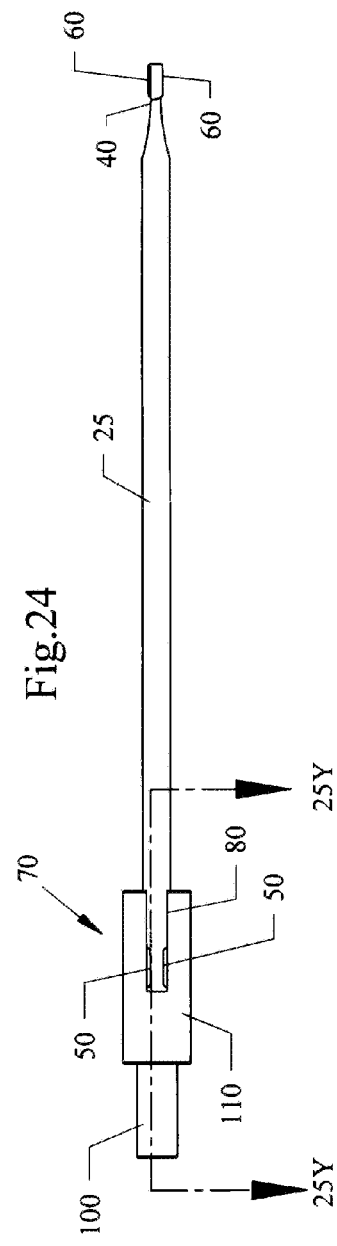
Fig.25
Fig.23
Fig.24

DRILL TIE STAKE

FIELD OF INVENTION

This invention relates to fasteners, and in particular to tie fastening devices, systems apparatus, and methods of fastening and staking concrete cloth, and landscape and erosion control stabilizer sheets and timbers in place with a drill adapted fastener.

BACKGROUND AND PRIOR ART

Concrete cloth and concrete canvas has become increasingly popular to lay on sloped ground surfaces in the water and in other hard to reach places. Concrete cloth is generally a cement impregnated fabric that is laid on a ground surface and becomes hardened after being wetted in place.

Currently several types of mechanical fasteners have been used to mount the concrete cloth in place, such as stapes, nails screws, hot rings, staking or pining or burying edges of the cloth.

However, each of the mechanical fasteners can be labor intensive and require substantial time and cost to be used. The typical mechanical fasteners such as the staples and nails have to be pounded in place which is not desirable over large spans.

Hot rings are generally used to fasten the concrete cloth to adjacent cloth or require the cloth to be attached to underlying mesh substrates, and also can be labor and material intensive.

While screws can be fastened using a power screw driver, the Philips or regular screw heads can be difficult to mount especially when large numbers of screws may be needed to fasten down large sections of concrete cloth. cannot be easily drilled into place Stakes and pinning are inserted into ground surfaces, but require each one be separately mounted which is also labor and material intensive. Additionally, the top ends of the stakes remain and protrude upward from the concrete cloth, which is also undesirable.

The assignees of the subject invention have been marketing the DRILL TIE® which is a drill adaptable spike type fastener for various construction projects, in concrete forming applications such as forming tie beam headers and columns. However, the conventional DRILL TIE® products are not able to be used for other applications such as for fastening sheet material used in concrete cloth applications and landscape and erosion control applications.

Many other types of fasteners have been proposed over the years but also fail to be both easily adaptable and economically feasible for concrete cloth applications and landscape and erosion control applications. See for example, U.S. Pat. No. 6,233,889 to Husley; U.S. Pat. No. 5,788,444 to Losada; U.S. Pat. No. 5,755,545 to Banks; U.S. Pat. No. 5,564,232 to Callaway; U.S. Pat. No. 5,449,139 to Herelier; U.S. Pat. No. 3,921,495 to Braun; U.S. Pat. No. 3,877,340 to Knohl; U.S. Pat. No. 3,870,428 to Jackson; U.S. Pat. No. 3,237,904 to Abruzese; U.S. Pat. No. 2,913,204 to Stewart; U.S. Pat. No. 2,840,092 to Hill; U.S. Pat. No. 1,767,565 to Thrift; U.S. Pat. No. 1,497,859 to Lilly; U.S. Pat. No. 1,144,700 to Edwards; U.S. Pat. No. 970,423 to Cunningham; and U.S. Pat. No. 746,006 to Brigham.

Thus, the need exists for solutions to the above problems with the prior art.

SUMMARY OF THE INVENTION

A primary objective of the present invention is to provide tie fastening devices, systems apparatus, and methods of fastening and staking concrete cloth, in place with a drill adapted fastener.

A secondary objective of the present invention is to provide tie fastening devices, systems apparatus, and methods of fastening and staking landscape and erosion control stabilizer sheets in place with a drill adapted fastener.

A third objective of the present invention is to provide tie fastening devices, systems apparatus, and methods of fastening and staking landscape timbers in place with a drill adapted fastener.

A fourth place of the present invention is to provide tie fastening devices, systems apparatus, and methods of fastening and staking concrete cloth and staking landscape and erosion control stabilizer sheets in place with tie fasteners having upper ends which can become flush against the cloth and sheets, to not protrude upward from the cloth and sheets.

A fifth objective of the present invention is to provide fastening devices, systems apparatus, and methods of fastening and staking concrete cloth and staking landscape and erosion control stabilizer sheets in place which is less labor and material intensive than stapes, nails screws, hot rings, staking or pining or burying edges of the cloth or sheets in place.

A sixth objective of the present invention is to provide fastening devices, systems apparatus, and methods of fastening and staking concrete cloth and staking landscape and erosion control stabilizer sheets in place which is easier and quicker to use than staples, nails screws, hot rings, staking or pining or burying edges of the cloth or sheets in place.

Tie fastener having a small anvil head end on an elongated shank with an opposite arrow tip blade tip end which is capable of being drilled into different materials. The tie fastener can have a length between approximately 6 inches to approximately 24 inches with a diameter along the shank portion being approximately ¼ of an inch. A partially flattened out notch portion can be located approximately ⅓ of an inch from the top anvil end and the notch can have a depth of approximately ⅛ of a inch. The width of the flattened out notch can be slightly larger than the original diameter of the shank. An approximately 1 inch to approximately 3 inch diameter washer with an approximately ¼ inch wide center hole is pre-located on the shank and can be angled to fit into the notch. The top anvil end of the tie fastener can fit into a novel chuck adapter that can be mounted in drill. Approximately can be +/−10%.

The user attaches the anvil top end to the adapter which is mounted to the drill, and the opposite blade tip end being pointed downward. The user can stake tie fasteners spatially apart from one another in rolled out concrete cloth. Driving the arrow blade tip end into the ground by the drill eventually causes the washer to slightly bend with the internal diameter hole becoming bent into the notch, jamming the washer into a tight fit. As the tie fastener is being driven into the ground, the lower surface of the washer presses and abuts against an upper portion of the laid out concrete cloth pushing the cloth against the ground surface. Additionally, a hammer can be used to drive or bend the upper portion into the ground. As a result the upper small anvil end of the tie fastener and washer become generally flush against the ground.

After the cloth is wetted, and later dries, the upper anvil end of the novel tie fastener does not extend up (does not stick up) above the cloth as compared to prior art fasteners. The novel tie fasteners remain permanently after the concrete cloth cures.

A tie fastener for fastening and staking concrete cloth, landscape and erosion control stabilizer sheets and timbers in place, can include an elongated metal shank having an upper end a lower end having a generally uniform diameter, an anvil end at the upper end of the shank, an arrow shaped blade at the lower end of the elongated metal shank, a notch adjacent to the upper end of the shank beneath the anvil end, and a washer wrapped about the elongated metal shank between the notch and the blade, wherein the washer abuts against a portion of the notch when the blade is driven into the ground.

The notch can include a flattened portion having a width larger than the diameter of the elongated shank, and a thickness smaller than the diameter of the elongated shank.

The blade can be generally flattened from the lower end of the elongated metal shank and forms a triangular configuration.

The blade can include an upwardly protruding burr edge along one side, and an upwardly protruding burr edge along an opposite side.

The anvil end can have a diameter substantially identical to the diameter of the elongated metal shank. The elongated shank can have a length of approximately 6 inches to approximately 24 inches, and a diameter of approximately ¼ of an inch, with the washer having an outer diameter of approximately 1 inch to approximately 3 inches.

A tie fastening system for fastening and staking concrete cloth, and landscape and erosion control stabilizer sheets and timbers in place, can include the combination of a tie fastener with an elongated metal shank having an upper end a lower end having a generally uniform diameter, an anvil end at the upper end of the shank, an arrow shaped blade at the lower end of the elongated metal shank, a notch adjacent to the upper end of the shank beneath the anvil end, a washer wrapped about the elongated metal shank between the notch and the blade, wherein the washer abuts against a portion of the notch when the blade is driven into the ground, along with a drill adapter with an upper end for being mounted to a drill and a lower end mounting about the anvil end of the tie fastener, wherein the tie fastener is adapted to hold in place concrete cloth, landscape and erosion control stabilizer sheets and timbers in place.

The drill adapter can include a first hollow cylinder having an open end adapted to wrap about the anvil end of the tie fastener, and a closed end, and a second solid cylinder attached to the closed end of the first hollow cylinder for being mounted to a drill.

A method for fastening and staking concrete cloth, and landscape and erosion control stabilizer sheets and timbers in place, can include the steps of providing elongated fasteners having an upper drill mounting end and a lower blade end, positioning a washer on the elongated fasteners adjacent to the upper drill mounting end, selecting a ground engaging member from the group comprising concrete cloth, landscape and erosion control stabilizer sheets and timbers, attaching the mounting end of the elongated fasteners to a power drill, laying the ground engaging member against a ground surface, and driving the blade end of the elongated fasteners into the ground and pushing the washers against the ground surface by operating the power drill.

The step of selecting the ground engaging member can include the step of selecting the concrete cloth.

The step of selecting the ground engaging member can include the step of selecting the landscape and erosion control stabilizer sheets.

The step of selecting the ground engaging member can include the step of selecting the timbers.

The method can further include the step of repeating the above steps for additional elongated fasteners with washers.

The method can further include the step of attaching the anvil end of the elongated fasteners to the drill with a drill adapter.

Further objects and advantages of this invention will be apparent from the following detailed description of the presently preferred embodiments which are illustrated schematically in the accompanying drawings.

BRIEF DESCRIPTION OF THE FIGURES

FIG. 1 is a perspective view of the tie fastener with washer.

FIG. 2 is an exploded view of the tie fastener separated from the washer.

FIG. 3 is a top view of the tie fastener with washer of FIG. 1.

FIG. 4 is a side view of tie fastener with washer of FIG. 1.

FIG. 5 is a left cap end view of tie fastener with washer of FIG. 1.

FIG. 6 is a right blade end view of tie fastener with washer of FIG. 1.

FIG. 7 is a top perspective view of tie fastener of FIG. 2 without washer.

FIG. 8 is a lower perspective view of tie fastener of FIG. 2 without washer.

FIG. 9 is an enlarged top dimensioned view of tie fastener of FIG. 9.

FIG. 10 is an enlarged side dimensioned view of tie fastener of FIG. 9.

FIG. 11 is an enlarged left cap end view of tie fastener of FIG. 9.

FIG. 12 is an enlarged right blade end view of drill tie fastener of FIG. 9.

FIG. 15 is an enlarged front perspective view of the drill adapter that can be used with the tie fastener of the preceding figures.

FIG. 16 is a back perspective view of the drill adapter of FIG. 15.

FIG. 17 is a top view of the drill adapter of FIG. 15.

FIG. 18 is a side view of the drill adapter of FIG. 15.

FIG. 19 is a left side view of the drill adapter of FIG. 15.

FIG. 20 is a right side view of the drill adapter of FIG. 15.

FIG. 21 is a perspective assembled view of the drill tie fastener with washer of FIGS. 1-14 engaged to the drill adapter of FIGS. 15-20.

FIG. 22 is an exploded view of the drill tie fastener with washer and drill adapter of FIG. 21.

FIG. 23 is a top view of the drill tie fastener of FIG. 21 without washer engaged to the drill adapter.

FIG. 24 is a side view of the drill tie fastener engaged to drill adapter of FIG. 21.

FIG. 25 is a cross-sectional view of the drill adapter engaged to the drill tie fastener of FIG. 24 along arrows 25Y showing the drive crimp engaged to slot in drill adapter.

DESCRIPTION OF THE PREFERRED EMBODIMENTS

Figure 13:
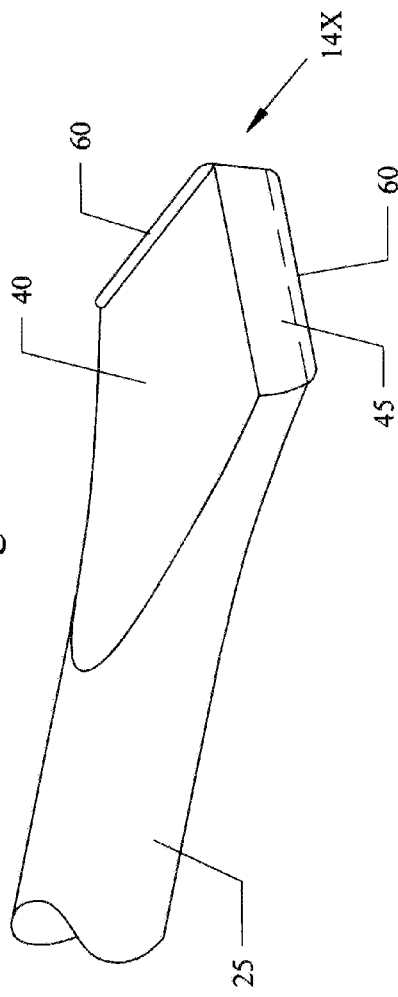
FIG. 13 is an enlarged top partial perspective view of the cutting head of the blade end of FIG. 9.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Each of the components will now be described.
10. Drill tie stake with washer attached.
20. Drill tie stake without washer.
25. Drive stake shank.
30. Washer.
40. Cutting head.
45. Cutting edges have approximate 15 degree angle to increase cutting efficiency.
50. Notch/Drive crimp provides drive surface for drill adapter as well as washer retention.
60. Sharp raised burr on each cutting edge increases cutting efficiency.
70. Drill adapter.
80. Slot for drive crimp on stake.
90. Bore to clear shank of drive stake.
100. Drill adapter shank is clamped in drill chuck.
110. Body of drill adapter.
120. Hand drill (prior art).
130. Erosion cloth or concrete cloth (prior art).
140. Ground.
150. Culvert or trench.
160. Landscape timber (prior art).
170. Landscape slope.

FIG. 1 is a perspective view 10 of the tie fastener stake shank 25 with washer 30. FIG. 2 is an exploded view 10 of the tie fastener shank 10 separated from the washer 30. FIG. 3 is a top view of the tie fastener shank 25 with washer 30 of FIG. 1. FIG. 4 is a side view of tie fastener shank 25 with washer 30 of FIG. 1. FIG. 5 is a left cap end view 10 of tie fastener shank 25 with washer 30 of FIG. 1. FIG. 6 is a right blade end view 10 of tie fastener shank 25 with washer 30 of FIG. 1. FIG. 7 is a top perspective view 20 of tie fastener shank 25 of FIG. 2 without washer 30. FIG. 8 is a lower perspective view 20 of tie fastener shank 25 of FIG. 2 without washer 30.

Figure 14A:
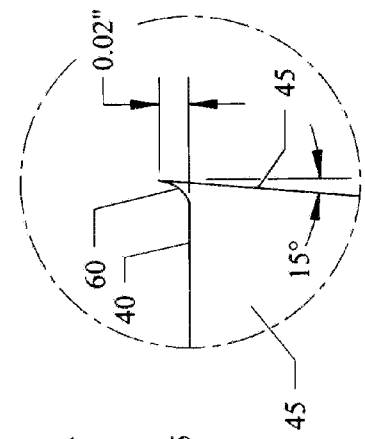
FIG. 14A is an enlarged view of the raised cutting burr on cutting edge of the cutting head of FIG. 14.
Figure 14:
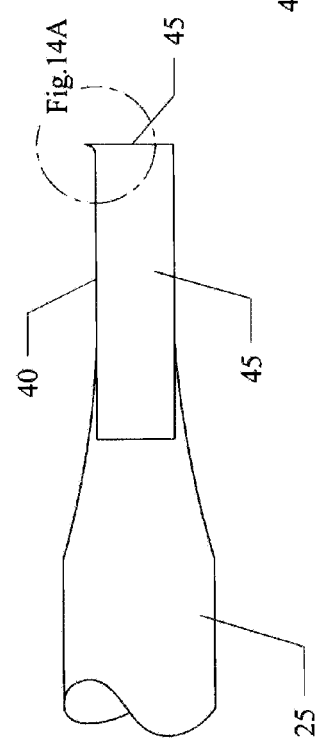
FIG. 14 is a side view of the cutting edge of the cutting head of FIG. 13 along arrow 14X.

FIG. 9 is an enlarged top dimensioned view 20 of tie fastener shank 25 of FIG. 9. FIG. 10 is an enlarged side dimensioned view 20 of tie fastener shank 25 of FIG. 9. FIG. 11 is an enlarged left cap end view 20 of tie fastener shank 25 of FIG. 9. FIG. 12 is an enlarged right blade end view 20 of drill tie fastener shank 25 of FIG. 9. FIG. 13 is an enlarged top partial perspective view of the cutting head 40 of the blade end of FIG. 9. FIG. 14 is a side view of the cutting edge of the cutting head 40 of FIG. 13 along arrow 14X. FIG. 14A is an enlarged view of the raised cutting burr 60 on cutting edge of the cutting head 40 of FIG. 14.

Referring to FIGS. 1-14A, the drill tie fastener 10 is formed from metal such as pressed steel and the like, and have a length of approximately 6 inches to approximately 24 inches between an anvil end 54 and the tip of the blade tip of the cutting head 40. The diameter of the elongated shank 25 can be approximately ¼ of an inch. A washer 30 can have an outer diameter of approximately 1 inch to approximately 4 inches, and an internal hole of slightly larger than approximately ¼ of an inch, where the washer 60 can slide up and down on the shank 25 between the flattened arrow shaped blade end of the cutting head 40 and the notch 50.

The notch 50 can be located approximately 0.16 of an inch from the anvil end 54, and can include a flattened portion having a diameter of approximately 0.12 inches and a width of approximately 0.36 inches and a length of approximately 0.33 inches. Approximately can be +/−10%.

The cutting head 40 is located at the opposite end of the shank 25 and can have a flattened arrow shaped blade with a triangular configuration. The arrow shaped blade having have a length of approximately 0.88 inches and a triangular extending blade portion having a length of approximately 0.34 inches, with the width of the blade having a diameter of approximately 0.45 inches, and the thickness of the flattened blade being approximately 0.09 inches. Extending upward from a first side edge of the blade can be a cutting edge 45 (raised burr) having an approximately 45 degree angle to increase cutting efficiency. A second cutting edge can be located on the second side edge 45 extending in an opposite direction.

FIG. 15 is an enlarged front perspective view of the drill adapter 70 that can be used with the tie fastener and washer combination 10 of the preceding figures. FIG. 16 is a back perspective view of the drill adapter 70 of FIG. 15. FIG. 17 is a top view of the drill adapter 70 of FIG. 15. FIG. 18 is a side view of the drill adapter 70 of FIG. 15. FIG. 19 is a left side view of the drill adapter 70 of FIG. 15. FIG. 20 is a right side view of the drill adapter 70 of FIG. 15. FIG. 21 is a perspective assembled view of the drill tie fastener with washer combination 10 of FIGS. 1-14 engaged to the drill adapter 70 of FIGS. 15-20. FIG. 22 is an exploded view of the drill tie fastener with washer combination 10 and drill adapter 70 of FIG. 21. FIG. 23 is a top view of the drill tie fastener of FIG. 21 without washer 20 engaged to the drill adapter 70. FIG. 24 is a side view of the drill tie fastener 20 engaged to drill adapter 70 of FIG. 21. FIG. 25 is a cross-sectional view of the drill adapter 70 engaged to the drill tie fastener 20 of FIG. 24 along arrows 25Y showing the drive crimp 50 engaged to slot in drill adapter 70.

Referring to FIGS. 16-25, the drill adapter 70 includes a hollow cylindrical body 110 with an open end and a bore 90 to clear the anvil head 54 of the shank 25 and a slot 80 through the sides of the cylindrical body 110 for the drive crimp 50 (notch) on the fastener tie shank 25. The opposite end of the cylindrical body 110 can have a narrower diameter drill adapter shank 100 that can be clamped in a drill chuck of a standard power drill 120 such as a CRAFTSMAN® power drill, and the like.

Figure 26:
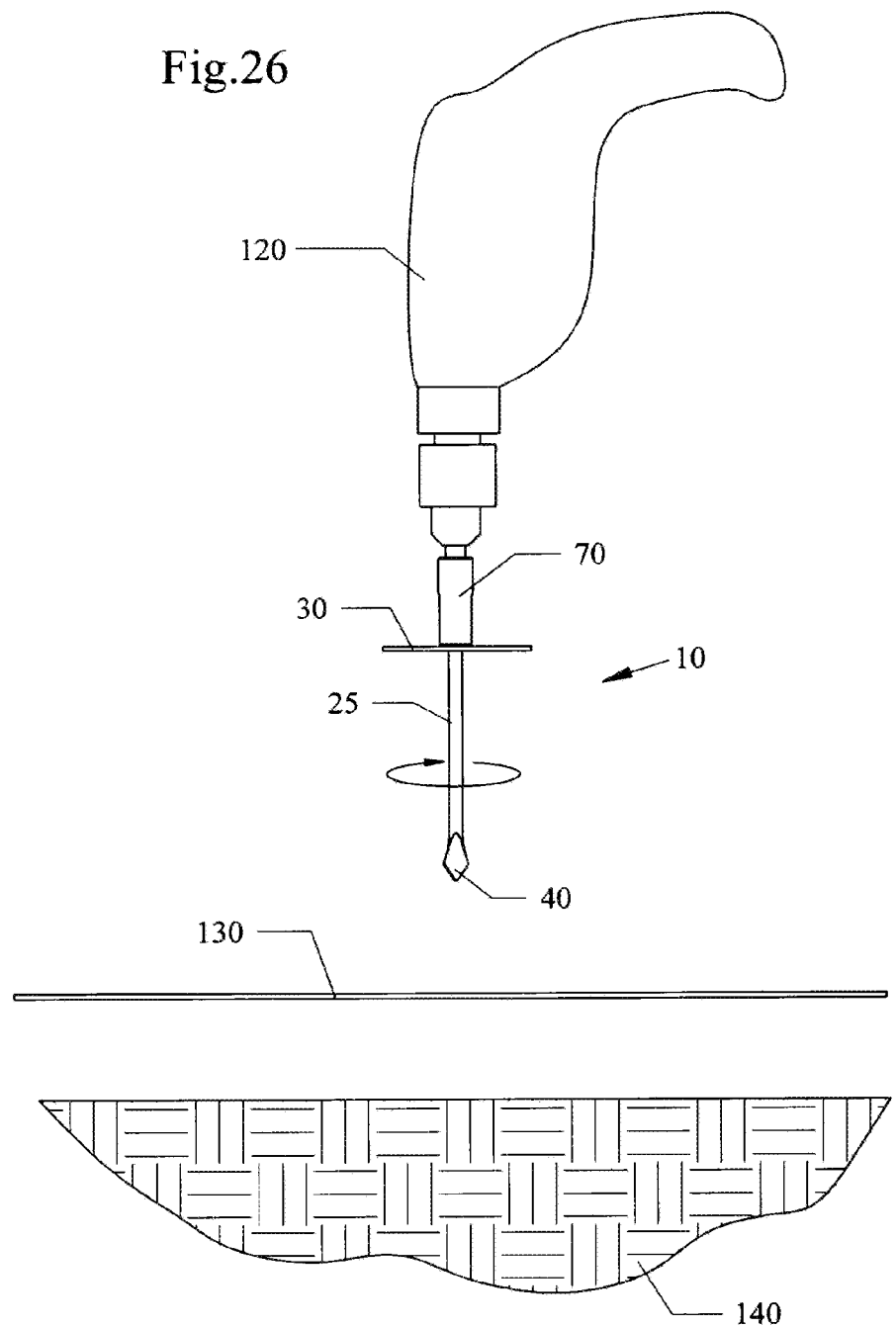
FIG. 26 shows a drill tie fastener with drill adapter of the preceding figures ready to be installed into erosion control or concrete cloth installation using a hand drill.

FIG. 26 shows a drill tie fastener combination 10 mounted to drill adapter 70 of the preceding figures ready to be installed into erosion control or concrete cloth 240 using a hand drill 120. Operating the drill 120, the cutting head 40 with arrow shaped blade rotates so that the burr cutting edges 45 on the sides of the flattened blade cut into both the concrete cloth or erosion cloth 130 and into the ground 140.

Figure 27:
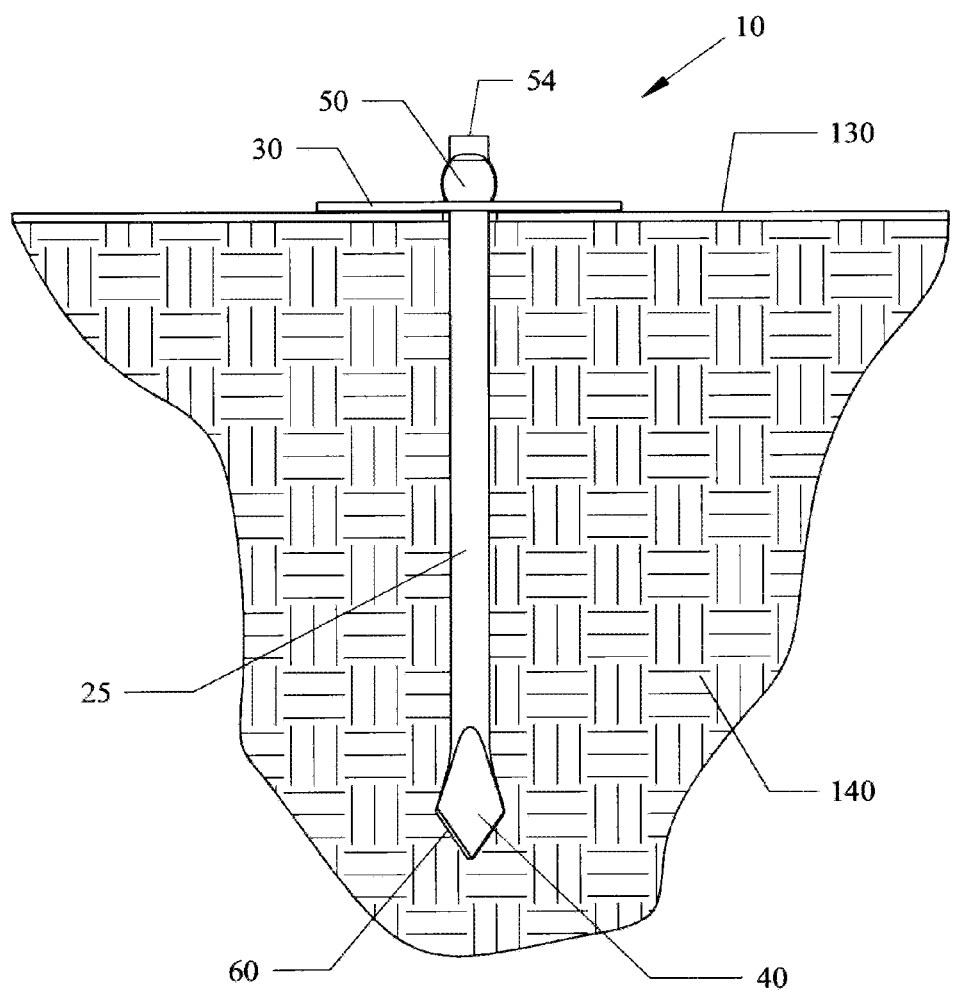
FIG. 27 shows the drill tie fastener installing and securing the erosion cloth/concrete cloth to ground of FIG. 26.

FIG. 27 shows the drill tie fastener and washer combination 10 installing and securing the erosion cloth/concrete cloth 130 to the ground 140 of FIG. 26. As the blade end rotates and digs deeper into the ground, the middle of the washer 30 can sink into the ground surface so that anvil end 54 can become substantially flush with the ground surface. Additionally, a hammer can be used to drive or bend the upper portion into the ground.

Figure 28:
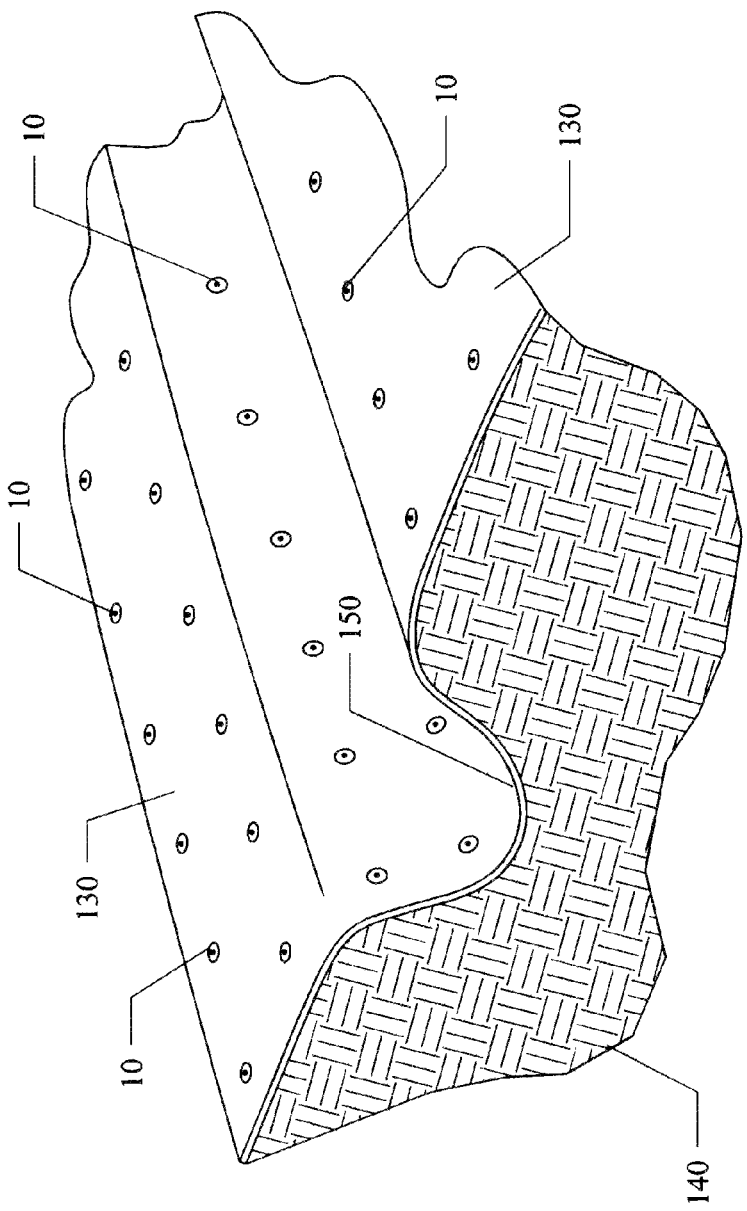
FIG. 28 shows erosion cloth installation in a culvert with multiple spaced apart tie fasteners of FIGS. 1-14.

FIG. 28 shows erosion cloth 130 installation in a culvert 150 with multiple spaced apart tie fastener combinations 10 of FIGS. 1-14. The user can easily drill each of the tie fastener combinations into the ground where the washers 30 press into the grounds and the anvil ends of the fasteners 10 become embedded into the ground and become flush to or beneath the ground surface.

Figure 29:
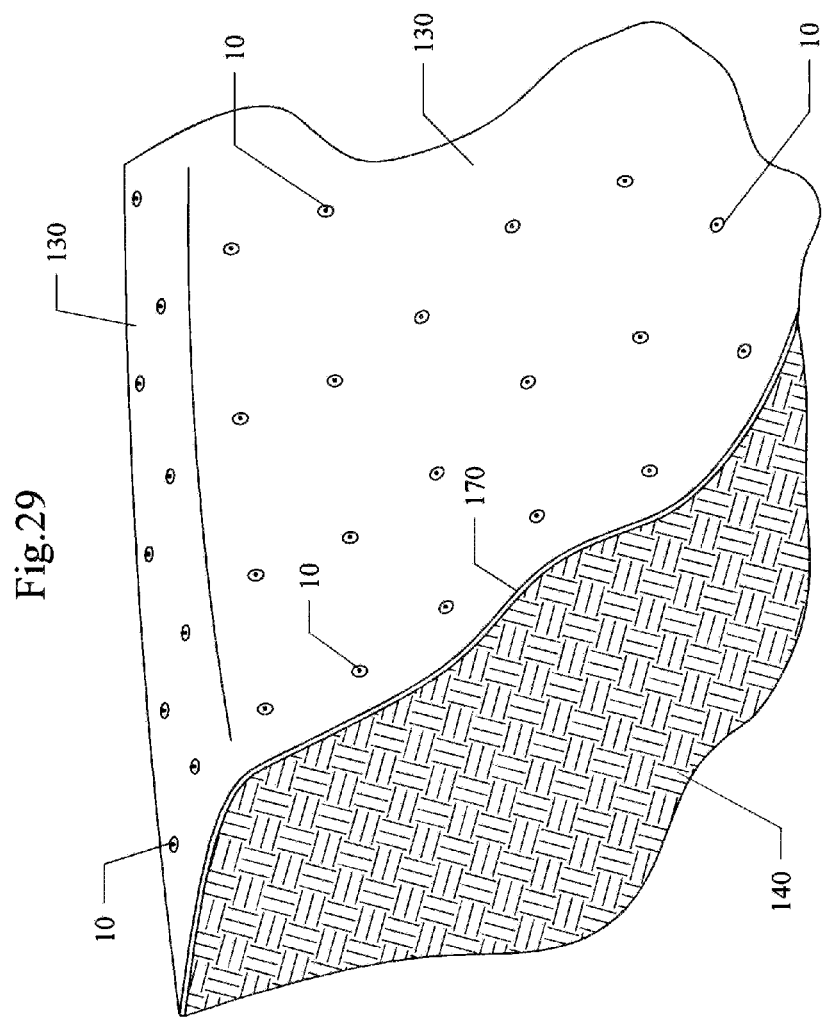
FIG. 29 shows the multiple space apart tie fasteners of FIGS. 1-14 for erosion cloth installation on a landscape slope.

FIG. 29 shows the multiple space apart tie fasteners 10 of FIGS. 1-14 for erosion cloth 130 installation on a landscape slope 170. Here, the fastener combinations 10 can be drilled into the ground similar to those shown and described in reference to FIGS. 26-28.

Figure 30:
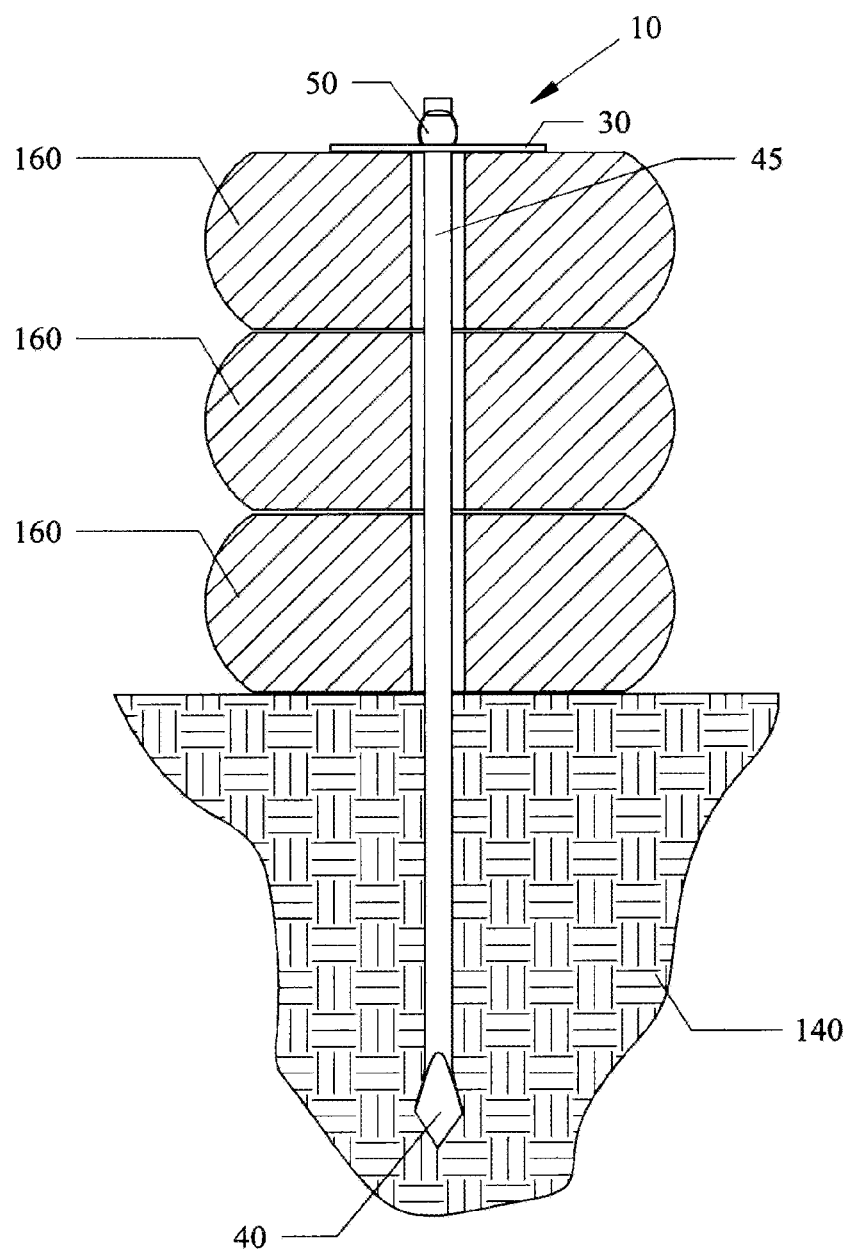
FIG. 30 shows drill tie fastener securing landscape timbers to the ground.

FIG. 30 shows drill tie fastener securing landscape timbers 160 to the ground 140. Similar to the previous applications, the novel fastener combinations 10 can attach timbers 160 in stacked configurations and other configurations, such as end to end, where tie fasteners can be angled into adjacent timbers.

Although the novel drill tie fasteners are described as being made from solid metal, the fasteners can be formed from other materials, such as but not limited to composites, alloys, plastics, combinations thereof, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A tie fastener for fastening and staking concrete cloth, landscape and erosion control stabilizer sheets and timbers in place, comprising:
    an elongated metal shank having an upper end a lower end having a generally uniform diameter;
    an anvil end at the upper end of the shank;
    an arrow shaped blade at the lower end of the elongated metal shank, having a portion with a width greater than the diameter of the elongated metal shank;
    a notch adjacent to the upper end of the shank beneath the anvil end, the notch having a width greater than the diameter of the elongated metal shank;
    a washer having an opening therethrough with a diameter of the opening being smaller than the width of the portion of the arrow shaped blade and the width of the notch, the washer wrapped about the elongated metal shank between the notch and the blade, wherein the washer abuts against a portion of the notch when the blade is driven into the ground.

2. The tie fastener of claim 1, wherein the notch includes a flattened portion having a width larger than the diameter of the elongated shank, and a thickness smaller than the diameter of the elongated shank.

3. The tie fastener of claim 1, wherein the blade is generally flattened from the lower end of the elongated metal shank and forms a triangular configuration.

4. The tie fastener of claim 3, wherein the blade includes an upwardly protruding burr edge along one side.

5. The tie fastener of claim 3, wherein the blade includes an upwardly protruding burr edge along an opposite side.

6. The tie fastener of claim 1, wherein the anvil end has a diameter substantially identical to the diameter of the elongated metal shank.

7. The tie fastener of claim 1, wherein the elongated shank has a length of approximately 6 inches to approximately 24 inches, and a diameter of approximately ¼ of an inch.

8. The tie fastener of claim 1, wherein the washer has an outer diameter of approximately 1 inch to approximately 3 inches.

9. A tie fastening system for fastening and staking concrete cloth, and landscape and erosion control stabilizer sheets and timbers in place, comprising in combination:
    a tie fastener with an elongated metal shank having an upper end a lower end having a generally uniform diameter;
    an anvil end at the upper end of the shank;
    an arrow shaped blade at the lower end of the elongated metal shank;
    a notch adjacent to the upper end of the shank beneath the anvil end;
    a washer wrapped about the elongated metal shank between the notch and the blade, wherein the washer abuts against a portion of the notch when the blade is driven into the ground; and
    a drill adapter with an upper end for being mounted to a drill and a lower end mounting about the anvil end of the tie fastener, wherein the tie fastener is adapted to hold in place concrete cloth, landscape and erosion control stabilizer sheets and timbers in place.

10. The drill tie system of claim 1, wherein the drill adapter includes:
    a first hollow cylinder having an open end adapted to wrap about the anvil end of the tie fastener, and a closed end; and
    a second solid cylinder attached to the closed end of the first hollow cylinder for being mounted to a drill.

11. A method for fastening and staking concrete cloth, and landscape and erosion control stabilizer sheets and timbers in place, comprising the steps of:
    providing elongated fasteners with an elongated shaft having an upper drill mounting end and a lower blade end;
    providing the upper drill mounting end with a notch having a width greater than a diameter of the elongated shaft;
    providing the lower blade end with a portion having a width greater than the diameter of the elongated shaft;
    positioning a washer having an opening therethrough on the elongated shaft of the elongated fasteners adjacent to the upper drill mounting end;
    providing the opening in the washer to have a diameter smaller than the width of the notch and the width of the portion of the lower blade end;
    selecting a ground engaging member from the group comprising concrete cloth, landscape and erosion control stabilizer sheets and timbers;
    attaching the mounting end of the elongated fasteners to a power drill;
    laying the ground engaging member against a ground surface; and
    driving the blade end of the elongated fasteners into the ground and pushing the washers against the ground surface by operating the power drill.

12. The method of claim 11, wherein the step of selecting the ground engaging member includes the step of selecting the concrete cloth.

13. The method of claim 11, wherein the step of selecting the ground engaging member includes the step of selecting the landscape and erosion control stabilizer sheets.

14. The method of claim 11, wherein the step of selecting the ground engaging member includes the step of selecting the timbers.

15. The method of claim 11, further comprising the steps of:
    repeating the above steps for additional elongated fasteners with washers.

16. The method of claim 11, further comprising the step of:
providing a drill adapter; and
attaching the anvil end of the elongated fasteners to the drill with the drill adapter.

* * * * *